Figure 3:
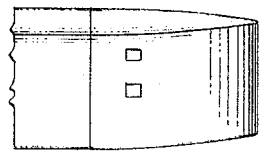

March 14, 1967  J. A. HERNDON  3,308,659
ELECTROMAGNETIC SPEED SENSOR
Filed April 17, 1963  4 Sheets-Sheet 1

INVENTOR
JAMES A. HERNDON
BY Donald J. Bradley
AGENT

March 14, 1967 J. A. HERNDON 3,308,659
ELECTROMAGNETIC SPEED SENSOR
Filed April 17, 1963 4 Sheets-Sheet 3
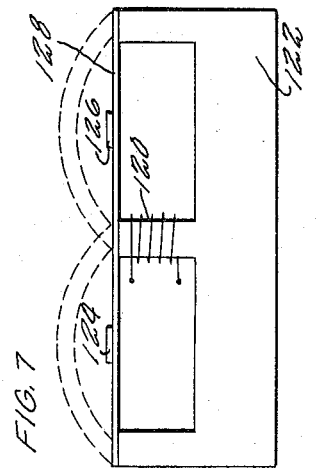
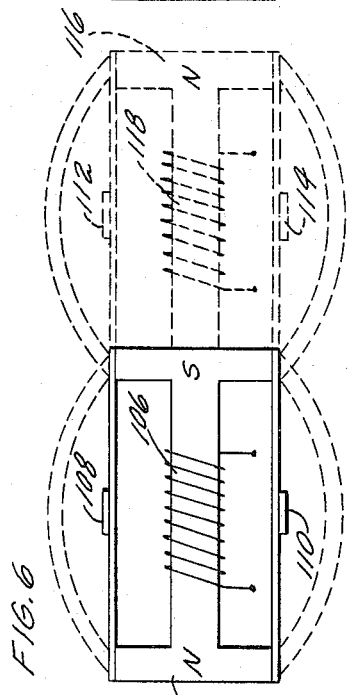
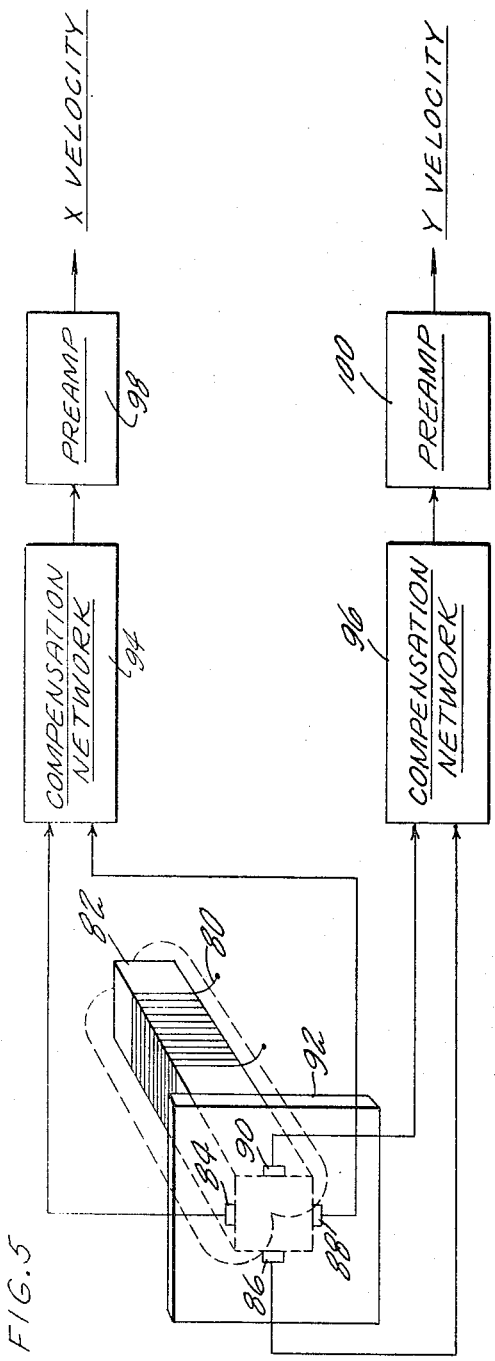
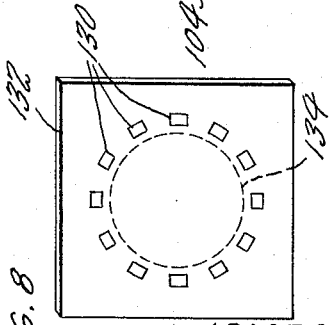
INVENTOR
JAMES A. HERNDON
BY Donald J. Bradley
AGENT March 14, 1967  J. A. HERNDON  3,308,659
ELECTROMAGNETIC SPEED SENSOR
Filed April 17, 1963  4 Sheets-Sheet 4

INVENTOR
JAMES A. HERNDON
BY Donald J. Bradley
AGENT

United States Patent Office 3,308,659
Patented Mar. 14, 1967

3,308,659
ELECTROMAGNETIC SPEED SENSOR
James A. Herndon, Coventry, Conn., assignor to United Aircraft Corporation, East Hartford, Conn., a corporation of Delaware
Filed Apr. 17, 1963, Ser. No. 273,607
4 Claims. (Cl. 73—194)

This invention relates to a speed sensor, and particularly to an electromagnetic sensor for measuring speed relative to water. A further novel feature of this invention is a speed sensing system for high speed marine applications in which the velocity of a craft may be accurately measured over a speed range from 0 to 100+ knots.

Recent technical advances have been made in the design of marine craft and powerplants for such craft which have greatly increased the speed of the craft. Hydrofoil craft, nuclear powerplants and turbine engines have all had a part in this speed increase. One of the problems caused by increased speed is that of accurately measuring craft velocity at high speeds without at the same time increasing the drag on the craft. Rod-meters and pressure sensing devices have been used, but have not proven entirely satisfactory. The speed sensor of this invention is a simple, reliable and inexpensive device which may be used with any craft to measure the speed of the craft without increasing the drag on the craft. A further part of this invention is a novel speed sensing system incorporating the speed sensor of this invention, the system compensating for any flow separation which may take place during high speed operation.

Briefly, the speed sensor or transducer comprises an electromagnet which generates an alternating magnetic field in the water surrounding the element. The water acts as a conductor and a voltage is induced in the water proportional to the flow velocity. Electrodes are placed in contact with the water to sense the induced voltage. The speed sensor is located in a position on the craft where the water flow is relatively undisturbed in order to obtain a true representation of the craft's velocity. In some cases, a symmetrical location of two transducers about the centerline of the craft is desirable in order to compensate for changes in flow patterns during maneuvers. The speed sensor and pickup electrodes are mounted flush with the craft to minimize drag, and the unique geometry of the electrodes provides additional advantages.

It is therefore an object of this invention to provide a novel electromagnetic speed sensor for accurately measuring the speed of a craft relative to water.

Another object of this invention is a novel electromagnetic speed sensor which may be mounted flush with the hull of a craft.

A further object of this invention is a novel electromagnetic speed sensing system for water craft which will compensate for changes in flow patterns during maneuvers.

Another object of this invention is a novel speed sensing transducer in which four or more electrodes are positioned around one end of a core whereby both velocity and direction may be measured.

Figure 1:
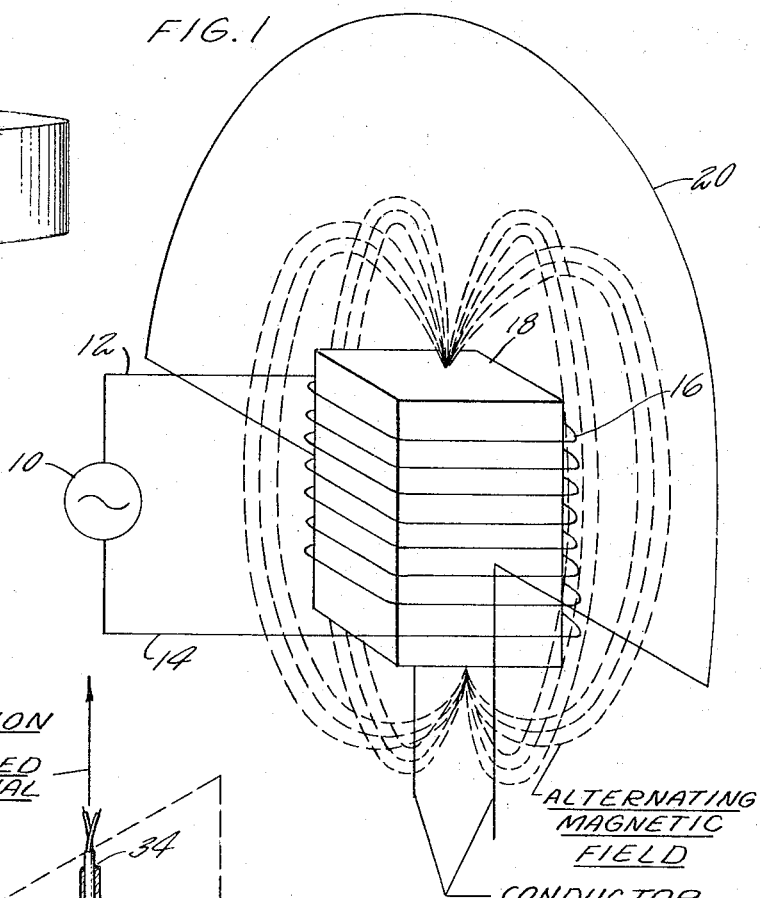
Figure 2:
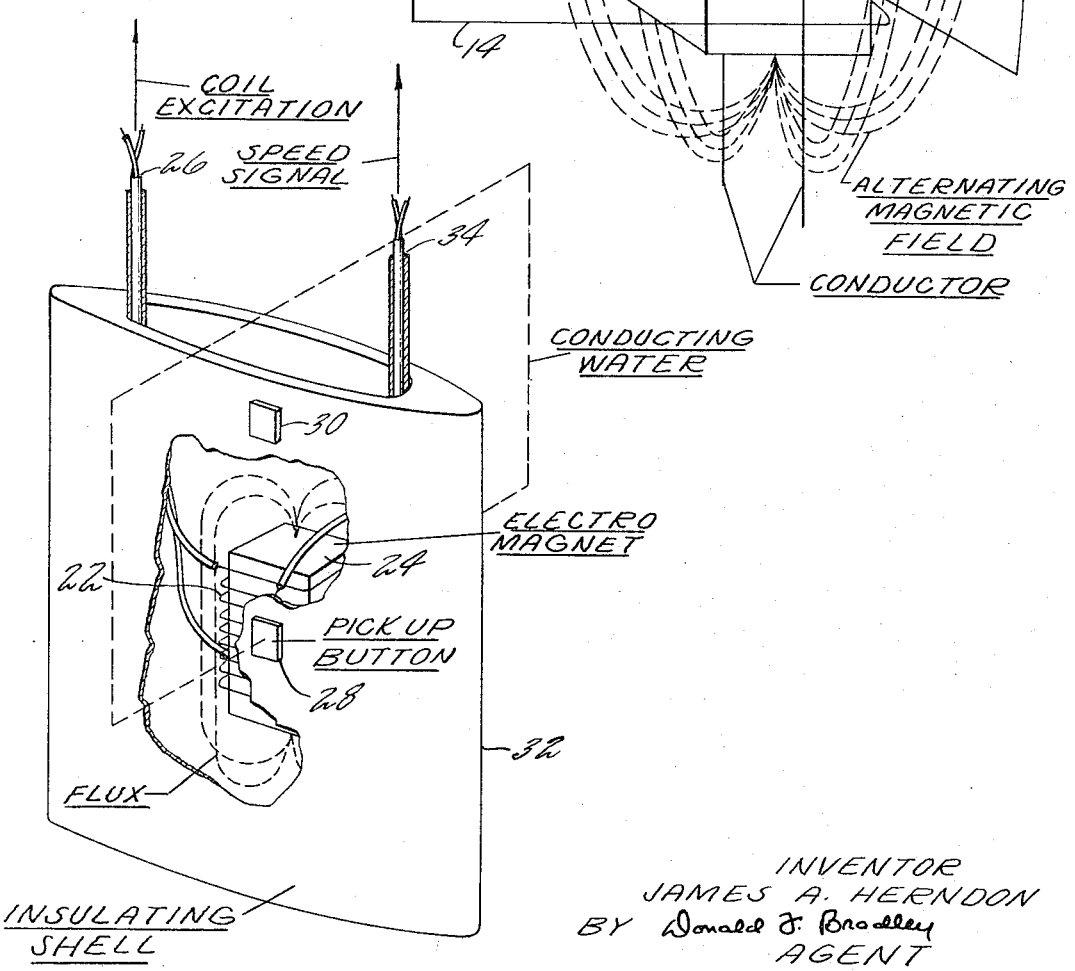
Figure 4:
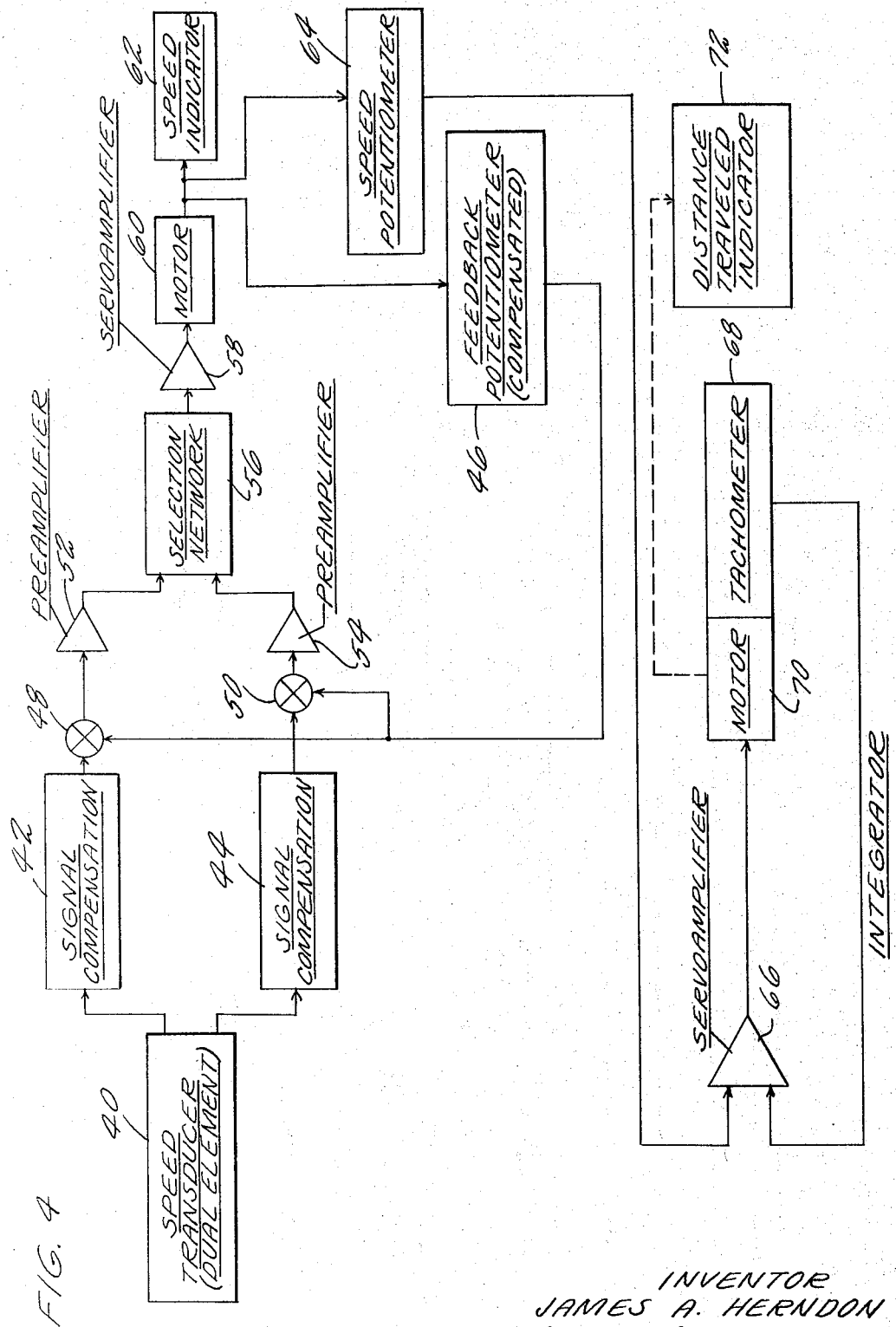
Figure 9:
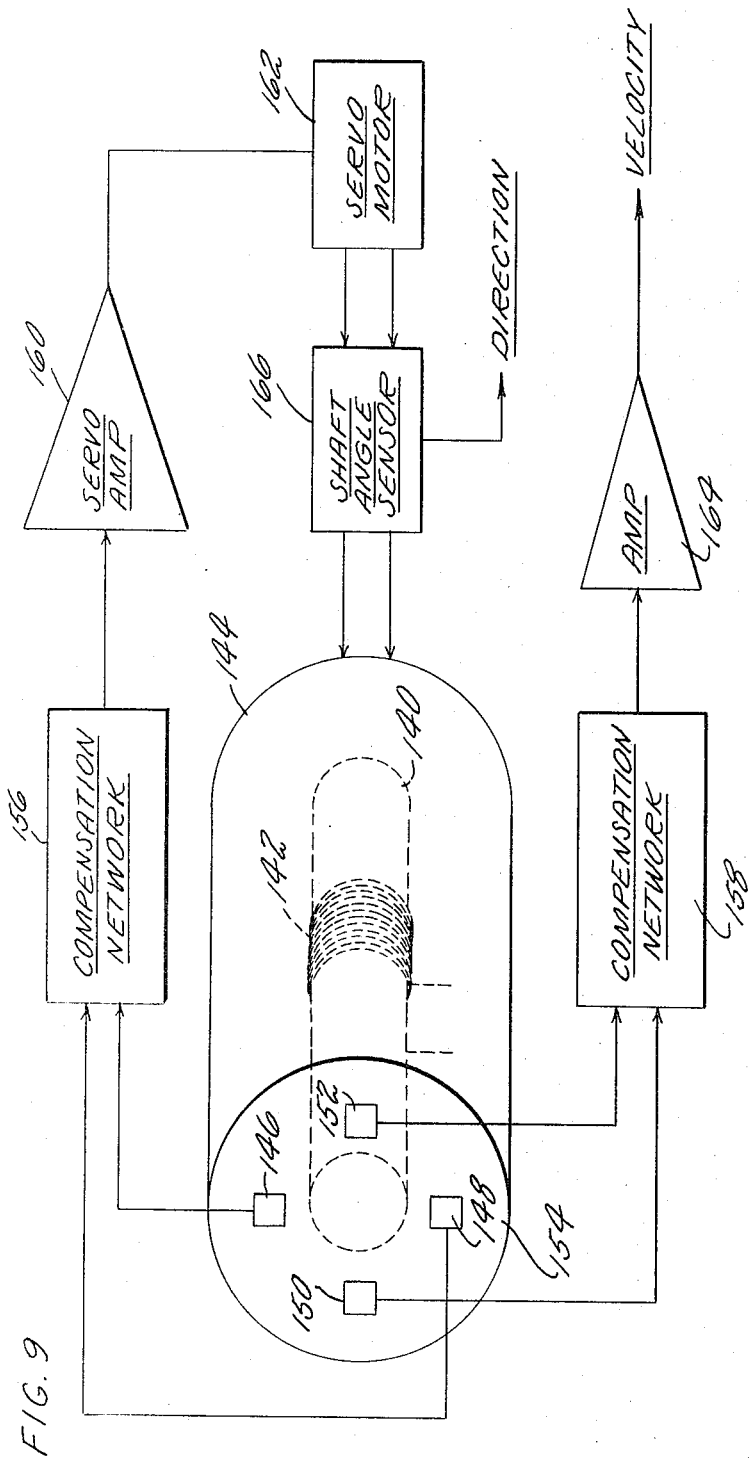

These and other objects and a fuller understanding of the invention may be had by referring to the following description and claims, taken in conjunction with the accompanying drawings, in which:

FIGURE 1 is a schematic drawing of the basic principles of operation of the speed sensor; and FIGURE 2 shows a typical speed sensor configuration; and FIGURE 3 shows another configuration of speed sensor; and FIGURE 4 is a schematic block diagram of a speed sensing system utilizing the speed sensor of this invention; and FIGURE 5 shows another speed sensor configuration; and FIGURE 6 shows a speed sensor having an H shaped core; and FIGURE 7 shows a speed sensor having an E shaped core; and FIGURE 8 shows an electrode arrangement for a plurality of electrodes; and FIGURE 9 shows a nulling type of speed sensor.

Electromagnetic speed transducers operate on the principle of Faraday's law which states that a conductor in a magnetic field will have a voltage induced in it directly proportional to the rate of change of flux linkages that link the conductor. In FIGURE 1, a source of alternating voltage 10 is connected to supply current through conductors 12 and 14 to a coil 16. An iron core 18 is inserted into coil 16 to decrease the reluctance and increase the magnetic flux, represented by the dotted lines, produced by the electromagnet. A stationary conductor 20 may be placed in the alternating magnetic field in such a manner that the changing flux field will not couple the conductor. However, by moving this conductor in a direction mutually perpendicular to the lines of flux and the conductor axis, a voltage will be induced in the conductor proportional to the rate of motion at the same frequency as the alternating magnetic field.

In the case of an electromagnetic speed sensor, a magnetic field is generated in the water surrounding the electromagnet. With reference to FIGURE 2, coil 22 is wrapped around core 24, and an alternating voltage supplied from an outside source through wires 26. A pair of pickup electrodes 28 and 30 are mounted flush with an insulating shell 32 which surrounds the electromagnet. Electrode 28 is mounted within the flux field, while electrode 30 is mounted away from the field and acts as a reference. The entire assembly may be attached to a craft, and the water flowing past the assembly acts as a conductor and a voltage is induced in the water proportional to the flow velocity, i.e., the velocity of the craft relative to the water. The electrode 28, being in contact with the water, senses the voltage induced in the water by the flux. The electrode 30, being in contact with the water but away from the flux field generated by the electromagnet, will pick up a voltage which is a function of the natural water environment unaffected by the induced electromagnetic flux, and thereby will act as a reference point. Wires 34 connected with electrodes 28 and 30 conduct the speed signal to the outside, for example, to the pilot's compartment.

While not shown in the figure, it is obvious that a second pair of electrodes identical to electrodes 28 and 30 may be placed on the back side of the insulating shell 32 to thereby provide two speed signals. As will be discussed in detail later, this second pair of electrodes may be necessary to provide an accurate speed signal during turning maneuvers of the craft.

An alternating magnetic field is used rather than a D.C. field to eliminate the problems of electrolytic and galvanic action which have a tendency to mask the signal. The frequency of operation of the electromagnet has a direct bearing on its behavior. In general, the lower the frequency, the lower the power requirement and better the behavior. Lowering the frequency reduces eddy currents and hysteresis losses in the core and eddy current and transformer effects in the water. D.C. operation is not practical because of the electrolytic and galvanic action.

Every craft has its own peculiar problems with regard to location of the speed transducer for optimum operation. For hydrofoil craft applications, for example, the design must take into consideration the type of foil system and foil design. The transducer must be wetted during flight operation which means location of the transducer on the foil structure is an important consideration. If the foils are retracted out of the water or to a location where undisturbed flow is not obtained around the transducer, a second transducer might be located for hull borne operation. Further restrictions are imposed on the location of the transducers for supercavitating foil arrangements. The transducers must be located such that, at any time, on any one transducer surface there will be no cavitation or separation. For supercavitating foils the transducer may be located on the bottom of the foil or in a pod or strut.

The transducer shown in FIGURE 3 forms the nose of the actuator pod of the forward foil of a hydrofoil craft. This design is free from cavitation at straight-line speeds well in excess of 100 knots. This design is essentially two transducers mounted back-to-back. The dual transducer arrangement is provided to allow continuous operation of the system at high speeds when a cavity forms on one side of the pod or strut for significant yaw angles, that is, the angle between the direction of flow and the strut cross section center line.

For some hydrofoil applications, it may be desirable to mount the transducer flush in the bottom of a foil, where almost continuous flow contact would be realized under both cavitating and supercavitating flow conditions.

Surface vessels can have the transducer or transducers mounted flush in the hull along the center line or symmetrically about the center line. Submarines may use a transducer mounted flush in the surface along the center line or on the nose of the hull below the surface water line. A dual transducer arrangement may be advantageous on large vessels where the transducer cannot be located along the center line and it is desirable to compensate for differential velocity between the transducer locations due to changes in flow patterns while turning.

FIGURE 4 shows, in block diagram form, a typical speed sensing system which may be used with a dual speed sensor. The speed sensor may be positioned almost anywhere on the craft, as long as it is in contact with the water. For example, for hydrofoil applications, the transducer may be located in a pod in front of the forward foil. During high speed operation in a turn, flow separation is possible on one side of the pod. A dual sensor arrangement is provided which essentially has a speed transducer on each side of the pod. Thus, either side of the transducer is capable of independent operation and is not adversely affected by flow separation on the other side. However, the electronics must differentiate between a good signal and a signal from the speed sensor which suffers from flow separation.

Referring now to FIGURE 4, the signals from each side of a dual speed sensor 40 are fed into compensating networks 42 and 44. The two signal compensation networks provide signals which eliminate extraneous fixed signals occurring because of magnetic fields in the vicinity of the speed sensors, cables from the transducer, and distortions of the magnetic field by conductive and magnetic materials in the vicinity of the transducer.

A negative feedback signal from feedback potentiometer 46, to be described, is summed with the compensated transducer signals at summing networks 48 and 50. This provides an error signal between the speed sensed by the transducer and the indicated speed. A series summation network is used which will not load the input signal. Thus, when the system is at a null, that is, when the input signal and indicated signal agree, the input impedance that the transducer is looking into is infinite. Changes in signal impedance caused by salinity and impurity changes in the water do not cause errors in the indicated speed.

The transducer signal will be approximately 300 microvolts per knot and is amplified in the preamplifiers 52 and 54 to boost the transducer signal to a more useful level. A selection network 56 is then required to reject the signal from a cavitating transducer.

The selection network 56 passes low error signals and greatly attenuates high error signals which would occur from a cavitating transducer to a constant low level. The signals are then summed to provide a composite error signal. The signals are not totally rejected because a power loss at high speed would cause the servo to remain locked at that speed where the failure occurred if the craft changed speed before the power was restored. By allowing some signals to pass, the servo will be self-resetting if this should occur. An error in the order of a few knots will occur in the indicated velocity under conditions where flow separation occurs on one side of the transducer. The servo amplifier 58 amplifies the composite error signal and drives the servo motor 60 to reduce the error between the sensed velocity and the indicated velocity. The servo motor drives the feedback potentiometer indicator 46 and/or speed indicator 62 and any any other data device required by the particular application.

A speed potentiometer 64 positioned by the speed indicating shaft from motor 60 provides an input to an integrating servo 66. A tachometer 68 on the integrating servo provides a signal proportional to shaft speed which is summed with the speed signal providing a velocity error signal to the servo amplifier which drives the motor 70. The motor speed then represents craft velocity. The motor may drive a cumulative counter 72 which indicates total distance traveled.

Additional equipment may be provided to give remote speed indication, remote distance indication, speed programming for stabilization equipment, navigation information such as latitude and longitude, distance traveled east-west and north-south, and many other applications.

Voltage and frequency regulation of the power supply will affect the transducer flux pattern, and this in turn influences the sensitivity of the transducers. For most accurate operation, some compensation will be supplied to compensate for the slight variations in flux pattern.

FIGURE 5 shows another possible transducer arrangement in which four electrodes are positioned symmetrically around one end of a core. A coil 80 having an alternating current supply is wrapped around the core 82, and an alternating flux field is thereby produced from the ends of the core 82. Four electrodes 84, 86, 88, and 90 are mounted on insulating board 92, and the board is positioned adjacent one end of the core 82. In this manner, the four electrodes are symmetrically coupled by the flux from the electromagnet perpendicular to the pickup pairs, and no signal voltages are produced in the electrodes. If a conducting fluid such as water is passed by the electrodes in the plane of the insulating material 92, a voltage is induced in the electrodes perpendicular to the flow. The water will generate a voltage mutually perpendicular to the flux, and the flow electrodes 84, 88, and 86, 90 will pick up the vector components of the voltage. The voltage across opposite electrodes 84 and 88 is fed to a compensation network 94, and likewise the voltage across electrodes 86 and 90 is fed to a network 96. After compensation, preamplifiers 98 and 100 amplify their respective signals producing $x$ and $y$ components of velocity.

It is apparent that a system such as the one just described is useful in obtaining information of water flow velocity and direction. For example, a submarine with a transducer such as the one shown in FIGURE 5 mounted on the top or bottom of its hull can now determine the current drift rate and direction of the water relative to the submarine. Likewise, information of ocean current and velocity may be useful for oceanographic purposes. The electrodes shown in FIGURE 5 will normally be mounted flush in insulating material 92 to minimize drag and disturbances to the flow.

FIGURE 6 shows a particular transducer configuration.

The core 104 is now in the form of an H, and coil 106 is wrapped around the middle of the core. Electrodes 108 and 110 may be mounted on an insulator between the legs of the core adjacent the electromagnetic flux. If desired, an additional pair of electrodes 112 and 114 may be positioned away from the flux field as shown. The operation of this type of transducer would then be similar to that shown in FIGURE 2. Also, if desired, an additional core piece 116 may be added to the electromagnet, together with a coil 118. In this way, all four electrodes 108, 110, 112, and 114 will be positioned in the magnetic field, and this will result in increased sensitivity and added accuracy.

FIGURE 7 shows the E type of core arrangement. In this case, coil 120 is wrapped around the center portion of the core 122. Electrodes 124 and 126 are then positioned in the flux field as shown. The electrodes will be mounted on insulating material 128. The core material 122 may also be circular so that a plurality of electrodes may be positioned around the core, thereby producing velocity and direction data similarly to the arrangement of FIGURE 5.

FIGURE 8 shows a plurality of electrodes 130 mounted on an insulating board 132 and positioned symetrically about the end of core 134 similarly to the arrangement of FIGURE 5. Commutating means may be used to null one pair of electrodes to produce angular data, while another pair of electrodes perpendicular to the nulled electrode pair would give accurate velocity data. The angular resolution produced by this method is directly related to the number of electrode pairs.

FIGURE 9 shows a means of accurately obtaining velocity and direction data from a transducer arrangement similar to that shown in FIGURE 5. The transducer is one integral unit and is utilized as a part of a servo system. Referring to the figure, core 140 and its associated coil 142 are mounted within an enclosed encapsulated unit 144. Two pairs of electrodes, 146, 148 and 150, 152 are mounted to an insulator 154 at one end of the unit 144. Connections are made to each electrode pair, electrodes 146, 148 being connected to compensation network 156 and electrodes 150, 152 being connected to network 158. A servo amplifier 160 and a servo motor 162 are connected with network 156, the motor 162 being used to rotatably drive transducer unit 144 by means of a suitable mechanical connection to thereby align electrodes 146, 148 to sense a zero voltage. Since an A.C. flux field is produced, the signal voltage received by the electrode pairs is sensitive to flow direction by means of signal phase and amplitude changes. Therefore, if the transducer unit 144 is rotated to produce a zero voltage across one pair of electrodes, the other pair of electrodes 150, 152 will be aligned to sense a maximum velocity signal, and this signal is fed through network 158 to amplifier 164. A directional pick-off such as shaft angle sensor 166 will indicate direction, so that this type of transducer will also produce accurate velocity and direction data.

While the invention has been shown and described in its preferred embodiments, other modifications will be apparent to those skilled in the art, and these arrangements may be resorted to without departing from the scope of the invention.

I claim:

1. Apparatus for sensing the speed of a fluid comprising:
   a core of magnetic material,
   means connected with said core for energizing said core and producing therefrom an alternating magnetic field,
   insulating means at least partially surrounding said core and having spaced walls positioned on opposite sides of said core within the influence of said magnetic field,
   a pair of electrodes mounted on each of said walls and adapted to contact the fluid, one of said electrodes of each pair being positioned within the influence of said magnetic field, the other of said electrodes of each pair being positioned substantially outside the influence of said magnetic field,
   and means responsive to the voltages generated in said electrodes for generating an output signal indicative of the speed at which the fluid flows past said electrodes.

2. Apparatus as in claim 1 in which each pair of electrodes produces a speed signal,
   selection means for combining both said speed signals to produce an indicated speed signal,
   means for comparing each of said speed signals with said indicated speed signal to produce a pair of error signals,
   and means for feeding said pair of error signals to said selection means, said selection means passing low error signals and attenuating high error signals and summing said error signals to thereby produce said indicated speed signal.

3. Apparatus as in claim 2 in which said speed sensor is utilized for sensing the speed of a vehicle through water,
   and includes means responsive to said indicated error signal for producing a signal indicative of vehicle distance traveled.

4. Apparatus for sensing the speed of a fluid comprising:
   a core of magnetic material, said core having first and second poles at the ends thereof,
   a winding about said core for energizing said core and producing an alternating magnetic field between said poles,
   a wall of insulating material positioned adjacent one of said poles within the influence of said magnetic field,
   a plurality of electrodes mounted on said wall symmetrically about said pole, said electrodes being within the influence of said magnetic field and adapted to contact said fluid,
   means for connecting together opposite electrodes to produce a plurality of pairs of electrodes, each pair of electrodes producing a speed signal indicative of fluid flow speed past said pair of electrodes,
   servo means responsive to said speed signals for aligning one of said pairs of electrodes in the direction of fluid flow, said aligned pair of electrodes producing an output signal indicative of maximum fluid velocity,
   and means responsive to said servo means for producing a signal indicative of fluid flow direction.

References Cited by the Examiner

UNITED STATES PATENTS

| 2,435,043 | 1/1948 | Lehde et al. | 73—194 |
| 2,969,673 | 1/1961 | Snyder et al. | 73—194 |
| 3,110,876 | 11/1963 | Ramey et al. | 73—194 X |
| 3,119,960 | 1/1964 | Kenyon | 73—194 X |
| 3,161,047 | 12/1964 | Griswold | 73—194 X |

OTHER REFERENCES

Article entitled—"The Measurement of Sea-Water Velocities by Electromagnetic Induction," by Guelke et al., The Journal of the Institution of Electrical Engineers, vol. 94, parts 2 and 3, pages 71–74, 1947.

RICHARD C. QUEISSER, *Primary Examiner.*

J. J. GILL, *Assistant Examiner.*